(12) United States Patent
Habershon

(10) Patent No.: US 9,403,563 B2
(45) Date of Patent: Aug. 2, 2016

(54) VEHICLE DRAG REDUCTION APPARATUS

(71) Applicant: Rodney Habershon, Hope Island (AU)

(72) Inventor: Rodney Habershon, Hope Island (AU)

( * ) Notice: Subject to any disclaimer, the term of this patent is extended or adjusted under 35 U.S.C. 154(b) by 0 days.

(21) Appl. No.: 14/424,984

(22) PCT Filed: Aug. 28, 2013

(86) PCT No.: PCT/AU2013/000957
§ 371 (c)(1),
(2) Date: Feb. 27, 2015

(87) PCT Pub. No.: WO2014/032093
PCT Pub. Date: Mar. 6, 2014

(65) Prior Publication Data
US 2015/0225025 A1    Aug. 13, 2015

(30) Foreign Application Priority Data
Aug. 29, 2012    (AU) ................................. 2012903719

(51) Int. Cl.
*B60J 9/00*        (2006.01)
*B62D 35/00*    (2006.01)
*B62D 27/02*    (2006.01)
(52) U.S. Cl.
CPC .............. *B62D 35/001* (2013.01); *B62D 27/02* (2013.01); *B62D 35/007* (2013.01)
(58) Field of Classification Search
CPC ..... B62D 35/001; B62D 27/02; B62D 35/007
See application file for complete search history.

(56) References Cited

U.S. PATENT DOCUMENTS

| | | | |
|---|---|---|---|
| 5,171,057 A | 12/1992 | Sharp | |
| 5,542,737 A | 8/1996 | Madden | |
| 6,685,256 B1 | 2/2004 | Shermer | |
| 6,779,834 B1 | 8/2004 | Keller | |
| 7,712,821 B2 * | 5/2010 | Moscoso Gomez . | B62D 35/007 296/180.1 |
| 8,196,996 B1 | 6/2012 | Campbell | |

FOREIGN PATENT DOCUMENTS

DE            31 15 742 A1    11/1982

OTHER PUBLICATIONS

International Search Report (PCT/AU2013/000957); Date of Mailing: Oct. 11, 2013.

* cited by examiner

*Primary Examiner* — Lori L Lyjak
(74) *Attorney, Agent, or Firm* — Howard & Howard Attorneys PLLC

(57) ABSTRACT

Drag reduction apparatus (18) attachable to a vehicle (10) wherein the drag reduction apparatus has a hollow duct section (21) having an open bottom end (43, 44) and a front wall (35) and a pair of opposed side walls (30, 31) wherein the front wall (35) and each side wall (30, 31) have a plurality of air outlets (42, 36, 37, 38, 39, 40, 41, 32, 33, 34) and a hollow air intake section (19) in fluid communication with the hollow section (21) having at least part thereof (87) in use spaced from a vehicle roof (13) and unsupported by the vehicle roof (13).

18 Claims, 6 Drawing Sheets

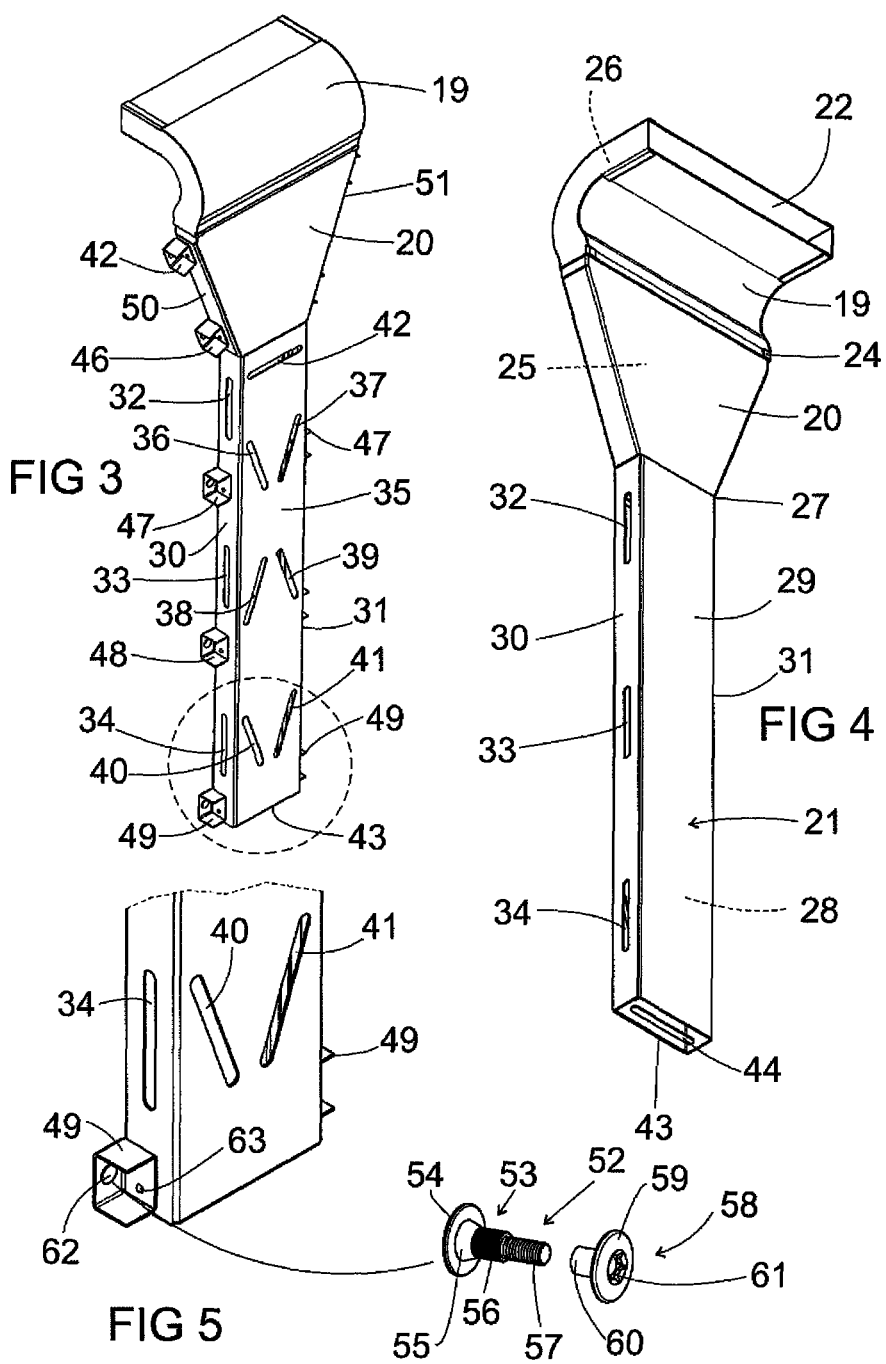

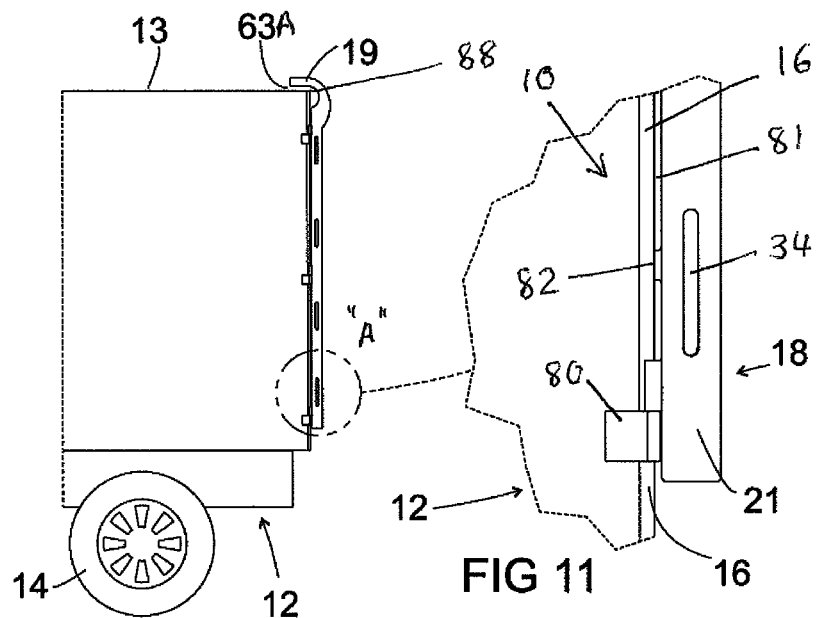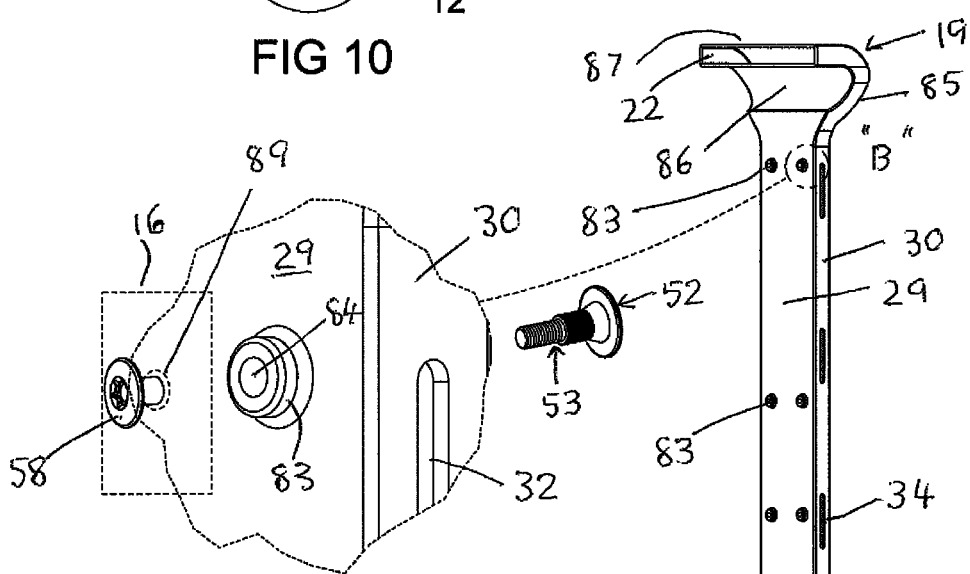

US 9,403,563 B2

VEHICLE DRAG REDUCTION APPARATUS

CROSS REFERENCE TO RELATED APPLICATION

This application is a national phase application of PCT/AU2013/000957, filed Aug. 28, 2013, which claims priority to Australian Patent Application No. 2012903719, filed Aug. 29, 2012, the disclosures of which are hereby incorporated by reference in their entirety.

FIELD OF THE INVENTION

This invention relates to drag reduction apparatus for use with vehicles such as trucks, tractors, vans and semi-trailers.

BACKGROUND OF THE INVENTION

It is a common problem in vehicles such as large trucks that during travel there is created a low pressure void behind the vehicle during travel and such low pressure void creates considerable drag on the speed of the vehicle which adds considerably to the cost of fuel consumption.

U.S. Pat. No. 4,320,920 provides an air deflector for reducing turbulence and drag at the rear area of vehicles having an elongate cellular structure having inner and outer plates spaced apart by a plurality of deflector ribs. The deflector can be shaped to the contour of a specific vehicle configuration such as being located on the roof of a vehicle adjacent a respective rear door. This air deflector was complicated in structure and was deficient in that it only diverted air perpendicularly into the rear plane of the vehicle to which it was attached and thus did not achieve an efficient and widespread dissemination of air or wind currents travelling along the roof of the vehicle.

U.S. Pat. No. 5,171,057 provided an air diversion apparatus which comprised of a plurality of L shaped air duct members each having a horizontal air intake component and a vertical component having an air outlet wherein the horizontal component was located on the vehicle roof and the vertical component was attached to a rear door of the vehicle. However such air diversion apparatus was complicated in structure in that the air intake opening of the horizontal component was in fluid communication with fluid conduits connected to a fluid reservoir having a fluid reservoir for cleaning operations. Also the air outlet was the only way wind currents could be disseminated from the vehicle which reduced drag reduction efficiency. Also opening or closing of the vehicle doors would have been relatively difficult because the horizontal component was described as being mounted to the roof of the vehicle or fixedly mounted to the vehicle roof.

Reference also may be made to U.S. Pat. No. 6,779,834 which described drag reduction apparatus having a tapered section attached to a roof, an elbow interconnecting the tapered section, and a duct section attached to a rear door of the vehicle. Opening or closing of the rear doors would have been difficult because the elbow engaged with an adjacent open end of the tapered section and also such engagement would have created leakage of air or wind currents which would have detracted from the drag reduction efficiency of the drag reduction apparatus. However the major problem of this prior art was that it was necessary to attach the tapered section to the roof by fasteners and thus installation would have been time consuming and labour intensive. Also the only air outlets provided were in the centre of the duct section as well as at a bottom end of the duct section and this also would have adversely affected operational efficiency.

OBJECT OF THE INVENTION

It is therefore an object of the invention to provide vehicle drag reduction apparatus which is efficient in operation and of simple structure.

SUMMARY OF THE INVENTION

The drag reduction apparatus of the invention therefore includes:
(i) a hollow duct section having an open bottom end and a front wall and a pair of opposed side walls wherein the front wall and each side wall have a plurality of air outlets; and
(ii) a hollow air intake section in fluid communication with the duct section having at least part thereof in use spaced from a vehicle roof and unsupported by the vehicle roof.

There also may be provided a hollow tapered section which interconnects the hollow duct section and the hollow intake section wherein the combination of the hollow duct section, hollow air intake section and hollow tapered section form a continuous body in the form of a tube or duct so that air or wind currents may enter the air intake section which may have an open end and exits through an open end of the duct section. The air outlets or openings in the side walls and front wall of the duct section provide an opportunity to obtain a widespread dissemination or spreading of the air or wind currents through each side wall of the duct section and the front wall of the duct section as well as vertically downwardly through the air outlet or open bottom end of the duct section.

Each side wall of the duct section may be provided with attachment brackets at spaced intervals along the length of each side wall and adjacent or intermediate an air outlet or a pair of air outlets. There also may be provided attachment brackets at spaced intervals along each side wall of the tapered section.

The hollow intake section by being spaced from the vehicle roof also provides for easy opening of both rear doors of the vehicle.

DESCRIPTION OF THE PREFERRED EMBODIMENT OF THE INVENTION

Reference may be made to a preferred embodiment of the present invention wherein:

FIG. 3 is a rear perspective view of the drag reduction apparatus shown in FIGS. 1-2;

FIG. 4 is a front perspective view of the drag reduction apparatus shown in FIGS. 1-2;

FIG. 5 is a detailed view of location "X" shown in FIG. 3 showing the attachment means;

FIG. 10 is a side view of the assembly of vehicle and drag reduction apparatus shown in FIG. 2 showing a new embodiment;

FIG. 11 is an enlarged area of location "A" shown in FIG. 10;

FIG. 12 is an enlarged area of location "B" shown in FIG. 13; and

FIG. 13 shows the attachment of the drag reduction apparatus of the invention to the vehicle.

Figure 1:
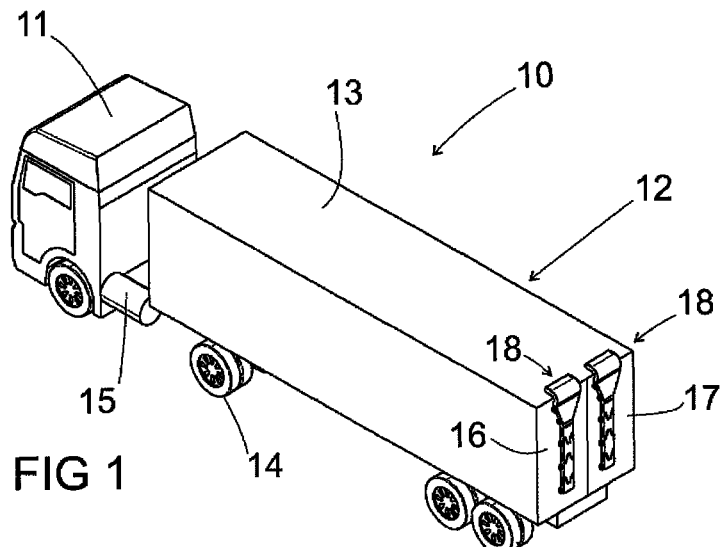
FIG. 1 is a perspective view of a vehicle to which the drag reduction apparatus is attached to each rear door.

In the drawings in FIG. 1 there is shown a semi-trailer vehicle 10 having cabin 11, body 12, roof 13, wheels 14, fuel tank 15 and rear doors 16 and 17. Each rear door 16 and 17 has a drag reduction apparatus 18 of the invention attached thereto.

Figure 2:
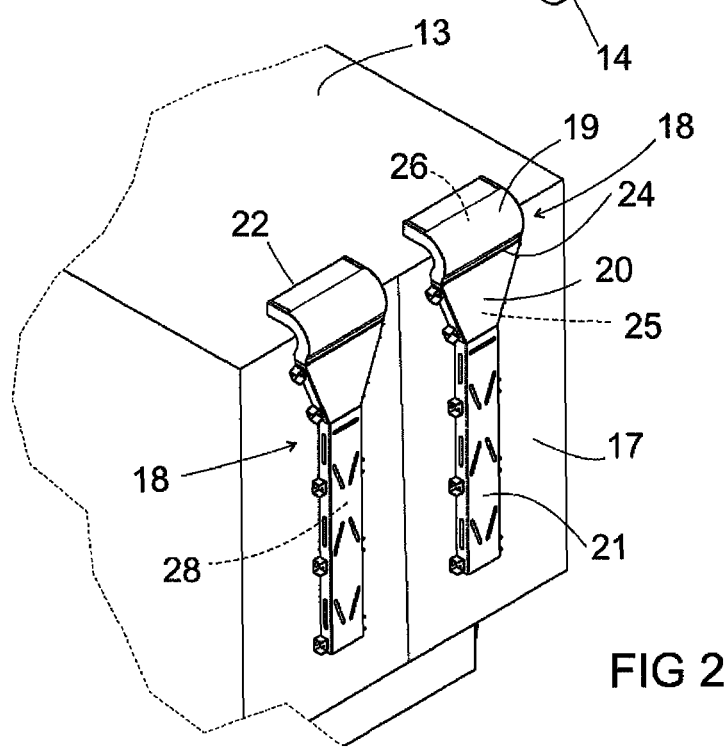
FIG. 2 is a detailed view of each rear door of the vehicle shown in FIG. 1 with the drag reduction apparatus of the invention attached thereto.

In FIGS. 2-4 there is shown drag reduction apparatus 18 having an upper intake section 19, a tapered section 20 and a duct section 21. Upper intake section 19 is provided with an intake opening 22 best shown in FIG. 4 with an arcuate body 23 shown in FIG. 4 and which is attached to tapered section 20 at 24 as shown in FIG. 4. Tapered section 20 has a hollow interior 25 which is contiguous with hollow interior 26 of upper intake section 19. Tapered section 20 also is attached to duct section 21 at 27 which also has a hollow interior 28. The rear wall 29 of duct section 21 does not have any apertures or slots and is mounted to an adjacent door 16 or 17 with the rear wall 29 abutting an outer surface of door 16 or 17. Duct section 21 is also provided with opposed side walls 30 and 31 which are each provided with outlet apertures 32, 33 and 34. There is also provided front wall 35 which is provided with angled outlet apertures 36, 37, 38, 39, 40 and 41. The front wall 35 of duct section 21 is also provided with an additional transverse outlet aperture 42.

The duct section 21 also has a base or bottom wall 43 which has outlet aperture 44 as best shown in FIG. 4.

In FIGS. 3 and 5 there is also provided attachment brackets 42A, 46, 47, 48 and 49 wherein each attachment bracket 42A and 46 is attached to side walls 50 and 51 of tapered section 20 and each of attachment brackets 47 and 48 are located between outlet apertures 32 and 33 and 33 and 34 respectively. Each bracket 49 is located below outlet aperture 34. The attachment of drag reduction apparatus 18 to an adjacent door is shown by fasteners 52 in FIG. 5 which include a threaded bolt 53 having head 54, spacer 55, intermediate part 56 and threaded shank 57. There is also provided nut/component 58 which has head 59 and shank 60 which has an internal thread (not shown) which engages with shank 57. Head 59 is provided with a hexagonal aperture 61 for engagement by a suitable tool (not shown). The bolt 53 extends through aperture 62 of bracket 49 as well as an aligned aperture (not shown) in door 16 and 17. Each bracket may be attached to an adjacent side wall 30 and 31 at 63.

Figure 6:
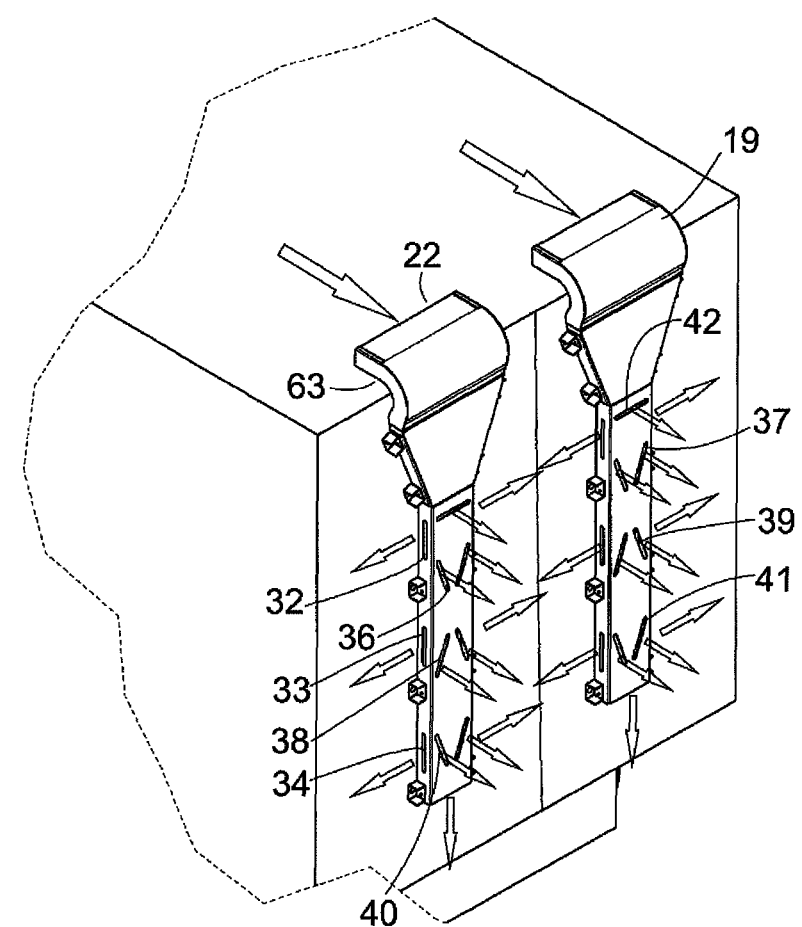
FIG. 6 is a perspective view similar to FIG. 2 showing the mode of operation of the drag reduction apparatus shown in FIGS. 1-2.
Figure 9:
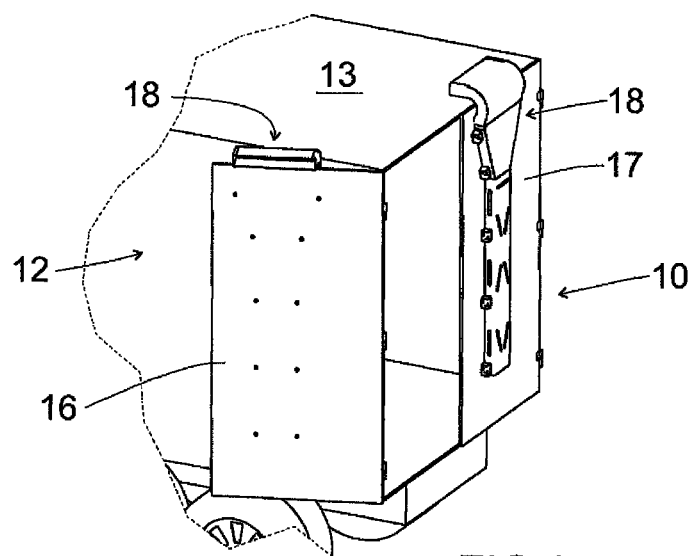
FIG. 9 is a similar view to FIG. 1 showing one of the rear doors of the vehicle opened.

In FIG. 6 upper intake section 19 is spaced from roof 13 of vehicle 10 as shown at 63A and this means that each rear door 16 and 17 can be opened and still carrying drag reduction apparatus 18 as shown in FIG. 9. In use air or wind currents created by travel of vehicle 10 enter each intake opening 22 as shown by the arrows in full outline and thus the air or wind currents travel through hollow interiors 26 and 25 of air intake section 19 and tapered section 20 before entering hollow interior 28 of duct section 21 and then exiting duct section 21 through outlet apertures 32, 33 and 34 of each side wall 30 and 31 as well as air outlet apertures 36, 37, 38, 39, 40 and 41 and 42 of each front wall 35 as shown by the arrows in full outline. Air also exits duct section 21 through bottom outlet aperture 44 also shown by the arrows in full outline.

Figure 7:
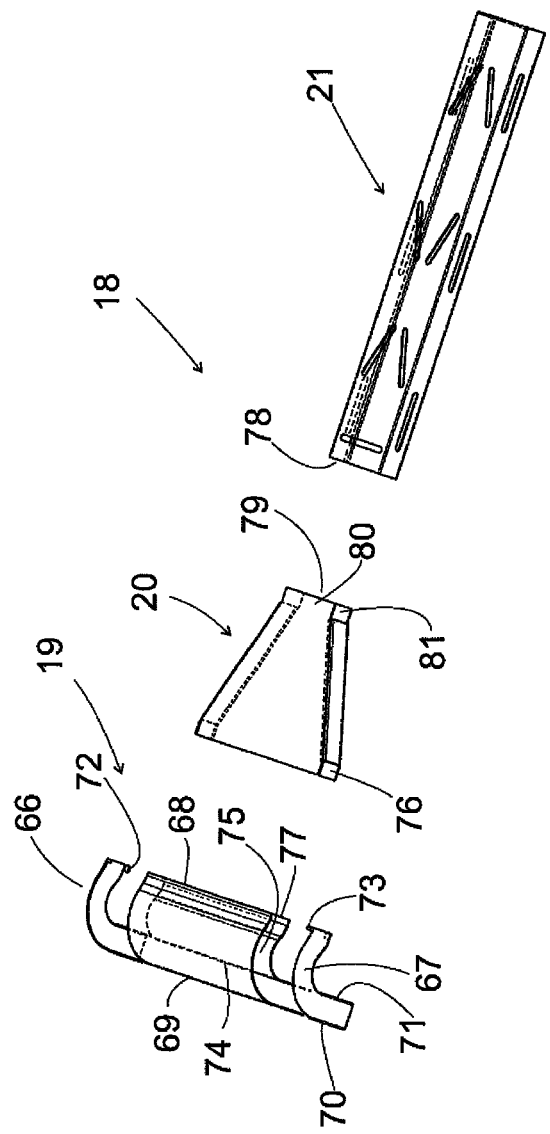
FIG. 7 is a perspective view showing the mode of manufacture of the drag reduction apparatus shown in FIG. 1.

In FIG. 7 there is shown how manufacture of drag reduction apparatus 18 may be carried out in relation to air intake section 19, tapered section 20 and duct section 21. Air intake section 19 has two arcuate sheets 68 and 69 of metal such as aluminum or iron being located in opposed relationship before being joined by side sections 66 and 67 which are each welded thereto. Each arcuate metal sheet 66 and 67 has flanges 70 and 71 and tabs 72 and 73 which each engage an adjacent external surface 74 and 75 of arcuate sheets 66 and 67. Each of flanges 70 and 71 and tabs 72 and 73 have a locating function.

Tapered section 20 has an end section 76 of rectangular cross section which engages with end socket 77 of air intake section 19 and is welded thereto. Duct section 21 has one end 78 which engages in socket 79 of tapered section 20 between flanges 80 and 81 and is also welded thereto. It will be appreciated that drag reduction apparatus 18 is manufactured in one piece prior to being attached to doors 16 and 17 of vehicle 10. The passage of air currents as shown in FIG. 6 means that there is a widespread and even dissemination of air currents from the vehicle 10 which successfully diverts such air currents to the location of a low pressure air void which is created by the speed of vehicle 10. This in turn will substantially reduce the amount of drag force applied to vehicle 10. In contrast in U.S. Pat. No. 6,779,834 the air outlet apertures or vents are located in a front wall of the duct section near an upper end of the duct section and a bottom end and thus there are no air currents being directed through the side walls of the duct section. This means that a widespread dissemination or dispersal of the air currents is not being achieved.

However a more significant disadvantage of U.S. Pat. No. 6,779,834 is that the top air intake section is bolted to the top of the roof of the vehicle and thus is a permanent fixture. When the rear doors of the vehicle are opened this means that a top end of an elbow section engages with an adjacent hollow end of the top air intake section and this arrangement is deficient because it does not provide an effective seal against air flow leaking sideways through the air intake section. Also after wear and tear opening of the doors may be adversely affected by the elbow contacting an internal surface of the air intake section which had to be provided with baffles to avoid air leakage as well as spacers to reinforce the strength of the air intake section.

Figure 8:
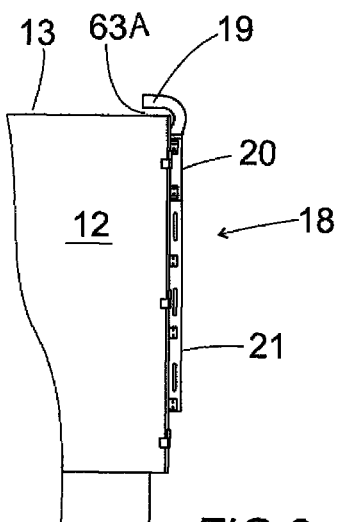
FIG. 8 is a side view of the vehicle and drag reduction apparatus shown in FIG. 1.

In FIG. 8 it will be noted that air intake section 19 is spaced from roof 13 by gap 63 and in FIG. 9 it is shown that movement of doors 16 and 17 can be accomplished efficiently and easily by virtue of gap 63A. There is also shown door hinges 80.

In another embodiment as shown in FIGS. 10-11 drag reduction apparatus 18 may be spaced from both rear doors 16 and 17 by a gap 81 which is provided by spacers 82 which may be moulded in with drag reduction apparatus 18 when it is a one piece mould. The purpose of spacers 82 is to maintain drag reduction apparatus 18 clear of locking bolts (not shown) used to lock doors 16 and 17.

FIGS. 12-13 show a similar view to FIG. 5 showing the attachment of drag reduction apparatus 18 to vehicle 10 by the use of fasteners 52 which include bolts 53 and nut components 58 which extend through co-aligned aperture 89 in door 16 and socket 84 defined by protrusions 83 in front wall 35.

It will also be appreciated that drag reduction apparatus 18 as shown in FIG. 10 also has an inwardly curved portion 85 defining a cavity 86 so that intake section 19 may adopt a suitable configuration or shape or have an orientation so that flat part 87 as shown in FIGS. 4 and 10 be coplanar with roof 13 and be spaced therefrom. Cavity 86 facilitates intake section 19 to extend around the junction 88 of the roof 13 and end door 16 and 17 as shown in FIG. 10 and also be spaced therefrom.

From the foregoing it will be appreciated that the invention as shown in the preferred embodiment in FIGS. 1-13 that drag reduction apparatus 18 may be made in one piece as shown in FIG. 7 before being attached to doors 16 and 17 thereby providing gap 63A between air intake section 19 and vehicle roof 13. Air flow through drag reduction apparatus 18 is also more efficient than the prior art discussed above because of the provision of air outlets or slots in side walls 30 and 31 and front wall 35. However, the installation process of drag reduction apparatus 18 to vehicle 10 is made more easier than the prior art by avoiding the necessity to fasten the drag reduction apparatus to the roof 13 of the vehicle.

It will also be appreciated that the invention includes within its scope the combination of the drag reduction apparatus and the vehicle.

The invention claimed is:

1. Drag reduction apparatus attachable to a vehicle, said drag reduction apparatus having:
   (i) a hollow duct section having an open bottom end and a front wall and a pair of opposed side walls wherein the front wall and each side wall have a plurality of air outlets; and
   (ii) a hollow air intake section in fluid communication with the hollow duct section having at least part thereof in use spaced from a vehicle roof and unsupported by the vehicle roof.

2. Drag reduction apparatus as claimed in claim 1 having a rear wall abutting one or more vertical doors of the vehicle.

3. Drag reduction apparatus as claimed in claim 1 having a rear wall which is spaced from one or more vertical walls of the vehicle.

4. Drag reduction apparatus as claimed in claim 1 further including a hollow tapered section which interconnects the hollow duct section and the hollow air intake section wherein the combination of the hollow duct section, hollow air intake section, and hollow tapered section forms a continuous body in the form of a tube or duct so the air or wind currents may enter the air intake section which has an open end of the duct section.

5. Drag reduction apparatus as claimed in claim 1 wherein each side wall of the hollow duct section is provided with attachment brackets at spaced intervals along the length of each side wall and adjacent or intermediate a pair of adjoining air outlets.

6. Drag reduction apparatus as claimed in claim 1 wherein at least some of the air outlets in the front wall of the hollow duct section are provided with angled air outlets.

7. Drag reduction apparatus as claimed in claim 5 wherein each of said attachment brackets has a section coplanar with an adjacent door of the vehicle and there are provided a pair of aligned apertures in the door and front wall of the drag reduction apparatus respectively through which a bolt may extend to engage with an adjacent nut to attach the drag reduction apparatus to the door.

8. A combination of a drag reduction apparatus and a vehicle wherein the drag reduction apparatus has:
   (i) a hollow duct section having an open bottom end and a front wall and a pair of opposed side walls wherein the front wall and each side wall has a plurality of air outlets; and
   (ii) a hollow air intake section in fluid communication with the hollow duct section characterized in that the hollow duct section is spaced from a roof of the vehicle and unsupported by the vehicle roof.

9. Drag reduction apparatus as claimed in claim 2 further including a hollow tapered section which interconnects the hollow duct section and the hollow air intake section wherein the combination of the hollow duct section, hollow air intake section, and hollow tapered section forms a continuous body in the form of a tube or duct so the air or wind currents may enter the air intake section which has an open end of the duct section.

10. Drag reduction apparatus as claimed in claim 3 further including a hollow tapered section which interconnects the hollow duct section and the hollow air intake section wherein the combination of the hollow duct section, hollow air intake section, and hollow tapered section forms a continuous body in the form of a tube or duct so the air or wind currents may enter the air intake section which has an open end of the duct section.

11. Drag reduction apparatus as claimed in claim 2 wherein each side wall of the hollow duct section is provided with attachment brackets at spaced intervals along the length of each side wall and adjacent or intermediate a pair of adjoining air outlets.

12. Drag reduction apparatus as claimed in claim 3 wherein each side wall of the hollow duct section is provided with attachment brackets at spaced intervals along the length of each side wall and adjacent or intermediate a pair of adjoining air outlets.

13. Drag reduction apparatus as claimed in claim 4 wherein each side wall of the hollow duct section is provided with attachment brackets at spaced intervals along the length of each side wall and adjacent or intermediate a pair of adjoining air outlets.

14. Drag reduction apparatus as claimed in claim 2 wherein at least some of the air outlets in the front wall of the hollow duct section are provided with angled air outlets.

15. Drag reduction apparatus as claimed in claim 3 wherein at least some of the air outlets in the front wall of the hollow duct section are provided with angled air outlets.

16. Drag reduction apparatus as claimed in claim 4 wherein at least some of the air outlets in the front wall of the hollow duct section are provided with angled air outlets.

17. Drag reduction apparatus as claimed in claim 5 wherein at least some of the air outlets in the front wall of the hollow duct section are provided with angled air outlets.

18. Drag reduction apparatus as claimed in claim 6 wherein each of said attachment brackets has a section coplanar with an adjacent door of the vehicle and there are provided a pair of aligned apertures in the door and front wall of the drag reduction apparatus respectively through which a bolt may extend to engage with an adjacent nut to attach the drag reduction apparatus to the door.

* * * * *